(No Model.)
M. REID.
DISH DRAINER.
No. 519,736.  Patented May 15, 1894.
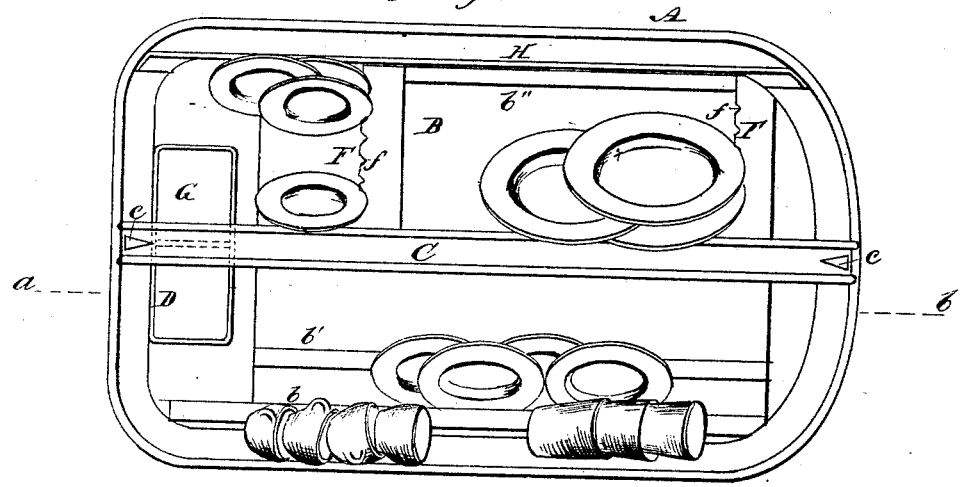
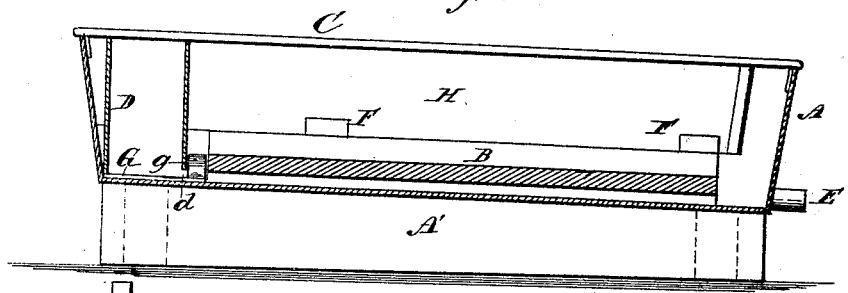
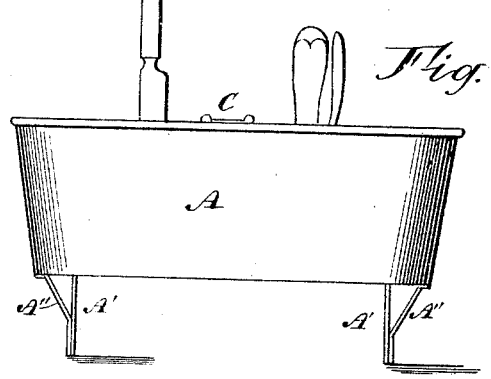
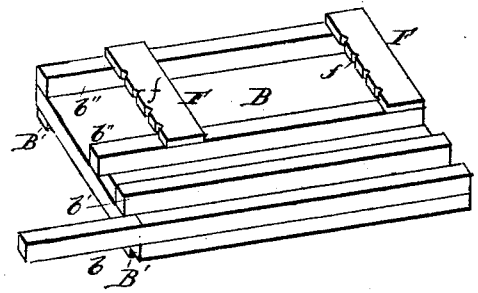
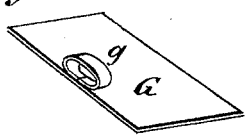
Attest
L. A. St. Johns
L. M. Martinez
Inventor.
Mary Reid.
By J. M. St. Johns
Atty.
THE NATIONAL LITHOGRAPHING COMPANY
WASHINGTON, D. C.

UNITED STATES PATENT OFFICE.

MARY REID, OF FAIRFAX, IOWA.

DISH-DRAINER.

SPECIFICATION forming part of Letters Patent No. 519,736, dated May 15, 1894.

Application filed October 2, 1893. Serial No. 486,960. (No model.)

*To all whom it may concern:*

Be it known that I, MARY REID, a citizen of the United States, residing at Fairfax, in the county of Linn and State of Iowa, have invented certain new and useful Improvements in Dish-Driers; and I do hereby declare the following to be a full, clear, and exact description of the invention, such as will enable others skilled in the art to which it appertains to make and use the same.

The object of this invention is to provide a suitable receptacle for dishes as they are washed, in which they may be conveniently placed to drain and dry.

The invention consists in the construction, combination and arrangement of parts to this end, as will be hereinafter fully set forth and claimed.

In the accompanying drawings, forming a part of this specification, Figure 1 is a plan view of a device embodying my invention. Fig. 2 is a longitudinal section of the same, in the line $a\,b$. Fig. 3 is an end elevation of the same. Fig. 4 is a view in perspective of the false bottom or platform on which the dishes rest to drain. Fig. 5 is a similar view of a plate to slip under the knife and fork receptacle for the protection of the bottom of the pan.

Similar letters of reference indicate corresponding parts.

Referring now to the drawings, A is a tin pan, oblong in form, with rounded corners, and flaring upwardly. This is mounted on supports A' A', which are a little longer at one end than the other, so as to give a suitable inclination to the pan to facilitate drainage through an outlet E at the lower end of the pan. The supports are braced by diagonal braces A" A", as shown in Fig. 3, and indicated by the dotted lines in Fig. 2.

The pan is provided with a longitudinal handle C, which also serves as a support for dishes, the lower edges resting on the platform B, and the upper portion leaning against said handle. To prevent the water draining from the dishes on this handle from running off outside the pan, the handle is provided with holes $c\,c$ near the ends, which allow the drip to run down through into the pan.

In the upper end of the pan is a receptacle D, divided by a partition, as indicated by the dotted lines in Fig. 1. One compartment is designed for the reception of forks and spoons, and the other for knives, though it will be understood that these articles may be placed in the receptacles indiscriminately, as preferred. The articles are placed in an upright position, and thus drain very quickly and completely. A little opening $d$ is provided at the bottom of the receptacle, to allow the drip to flow out.

In the bottom of the pan is placed a removable platform B, raised a little from the bottom of the pan by suitable ribs B' B', thus allowing the water to escape under it. The upper side of the platform is provided with a number of longitudinal ribs $b\,b'\,b''$. Those on the front side (the lower side in Fig. 1) serve as supports for the lower portions of the articles (cups, tumblers, saucers and the like) placed in this part of the pan to drain. These ribs are of such a height, and at a suitable distance apart to serve in and of themselves as a support for such dishes as small plates, saucers, &c., which being placed between the ribs in zigzag order are held in a slightly inclined position to drain. The number of these ribs may vary with the size of the pan. On the other side of the platform transverse bars F F are connected with the longitudinal ribs $b''\,b''$. On the side nearer the higher portion of the pan these ribs are provided with notches $f\,f$, which serve to catch the edges of plates and prevent the bottom thereof from slipping. Plates are set in this portion of the pan in zigzag order, as shown.

The platform B and its connected ribs are made of wood, which material absorbs the drops of moisture clinging to the dishes, and renders them drier than a metallic bottom would.

As the place where the knives and forks rest is exposed to extra wear, I provide a false bottom for this portion of the pan. This is a removable plate G provided with a suitable handle $g$, which may be slipped in at the bottom of the receptacle D when the platform B is not in position. When the said platform is in position the plate is held thereby from displacement.

Near the back edge of the pan is another longitudinal support H, against which plates and other articles are leaned, as indicated. This is a rib standing edge up, with its ends suitably fastened to the ends of the pan. It will be understood that the space between this rib and the side of the pan may be utilized as a receptacle for plates and the like, as well as the other side. This rib prevents the plates from tipping over against the flaring side of the pan while being placed in a zigzag position to dry.

The device as thus constructed is a simple and convenient kitchen utensil, by means of which dishes may be suitably stacked for drying. To rinse, hot water is poured on from a tea kettle, penetrating all parts; then everything is either turned over or shoved in a zigzag position to dry.

Instead of tin, the pan may be of galvanized iron, or granitized ware, for better protection against rust.

Having thus fully described my invention, what I claim as new, and desire to secure by Letters Patent, is—

In a dish-dryer, the combination of the pan A having supports A' A' inclining the bottom of the pan, the handle C having drainage holes c c, the longitudinal rib H, and the removable wooden platform B having ribs on the top thereof running parallel with the handle, substantially as and for the purpose set forth.

In testimony whereof I affix my signature in presence of two witnesses.

MARY REID.

Witnesses:
L. M. MARTINEK,
M. E. LONG.